United States Patent [19]

Shibata et al.

[11] Patent Number: 5,123,099
[45] Date of Patent: Jun. 16, 1992

[54] HOT STANDBY MEMORY COPY SYSTEM

[75] Inventors: Yuji Shibata, Kawasaki; Tetsuo Urushihara, Sagamihara, both of Japan

[73] Assignee: Fujitsu Ltd., Kawasaki, Japan

[21] Appl. No.: 219,565

[22] Filed: Jul. 15, 1988

[30] Foreign Application Priority Data

Jul. 15, 1987 [JP] Japan ................. 62-174874

[51] Int. Cl.⁵ .................................. G06F 12/00
[52] U.S. Cl. .................. 395/425; 364/DIG. 1; 364/228.3; 364/243; 364/243.41; 364/213.4; 364/268; 364/268.3; 364/243.1; 371/10.1
[58] Field of Search ... 364/200 MS File, 900 MS File; 371/8.1, 10.1, 11.1, 11.3

[56] References Cited

U.S. PATENT DOCUMENTS

| | | | |
|---|---|---|---|
| 4,077,059 | 2/1978 | Cordi et al. | 364/200 |
| 4,428,044 | 1/1984 | Liron | 364/200 |
| 4,466,062 | 8/1984 | Krikor | 364/200 |
| 4,494,190 | 1/1985 | Peters | 364/200 |
| 4,503,534 | 3/1985 | Budd et al. | 371/11.3 |
| 4,571,674 | 2/1986 | Hartung | 364/200 |
| 4,603,406 | 7/1986 | Miyazaki et al. | 371/10.1 |
| 4,639,860 | 1/1987 | Peters | 364/200 |
| 4,773,003 | 9/1988 | Hauge | 364/200 |
| 4,958,273 | 9/1990 | Anderson et al. | 371/8.1 |

FOREIGN PATENT DOCUMENTS 0083400 7/1983 European Pat. Off. .
2006488A 5/1979 United Kingdom .

OTHER PUBLICATIONS

European Search Report performed at The Hague on Jul. 16, 1990 by Examiner Sarasua Garcia L.

Primary Examiner—Joseph A. Popek
Assistant Examiner—Rebecca L. Rudolph
Attorney, Agent, or Firm—Staas & Halsey

[57] ABSTRACT

Disclosed is an electronic exchange with a hot standby memory copy system including main storage devices that are duplexed wherein to improve the processing capacity of a central processing unit and make the best use of the speed of a cache memory, in an information processing apparatus provided with central processing units, main storage devices and cache memories all of which are duplexed, first-in first-out memories that are duplexed and connected to the central processing units, a unit for simultaneously writing data, when the central processing unit writes the data into the cache memory, into the first-in first-out memory, and a unit for writing, independently of an operation of the central processing unit, the contents of a currently used one of the first-in first-out memories into a standby one of the main storage devices are provided.

13 Claims, 16 Drawing Sheets

ACTIVE SYSTEM      STANDBY SYSTEM

PRINCIPLE EXPLANATORY
VIEW OF PRESENT INVENTION

PRINCIPLE EXPLANATORY
VIEW OF PRESENT INVENTION

PRINCIPLE BLOCK DIAGRAM SHOWING COPY BACK MODE
MEMORY COPY SYSTEM ACCORDING TO ONE EMBODIMENT
OF PRESENT INVENTION

EXPLANATORY BLOCK DIAGRAM OF VARIOUS CONTROL SIGNALS USED IN EMBODIMENT OF FIG. 3

PRINCIPLE BLOCK DIAGRAM OF ANOTHER
EMBODIMENT OF PRESENT INVENTION
ACCORDING TO WRITE THROUGH MODE

PRINCIPLE BLOCK DIAGRAM
MODIFIED FROM FIG. 8

Fig. 10  DETAILED BLOCK DIAGRAM OF EMBODIMENT OF FIG. 8

EXPLANATORY BLOCK DIAGRAM OF VARIOUS CONTROL SIGNALS USED IN EMBODIMENT OF FIG.10

EXPLANATORY BLOCK DIAGRAM OF VARIOUS CONTROL SIGNALS USED IN EMBODIMENT OF FIG. 12

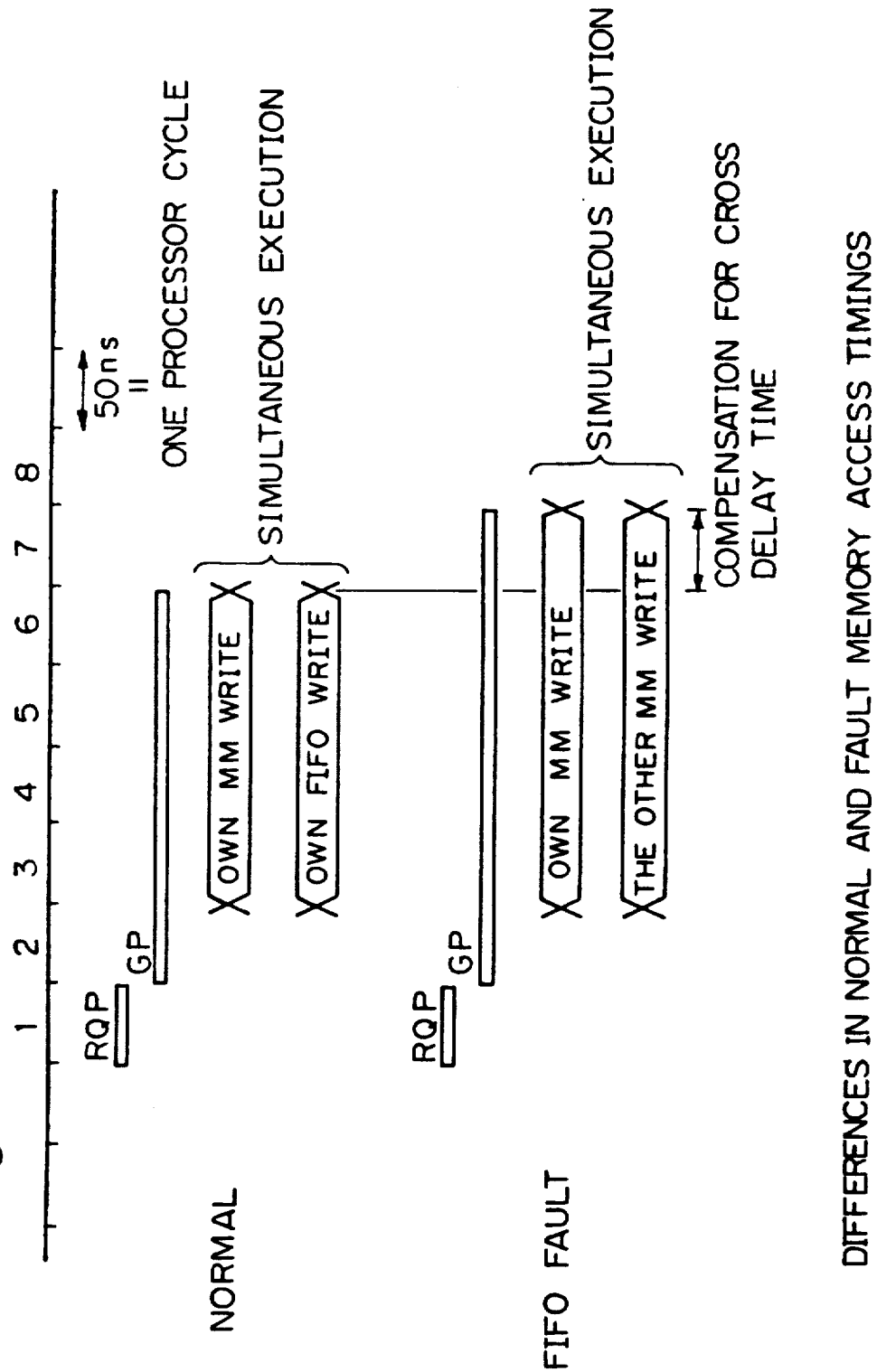

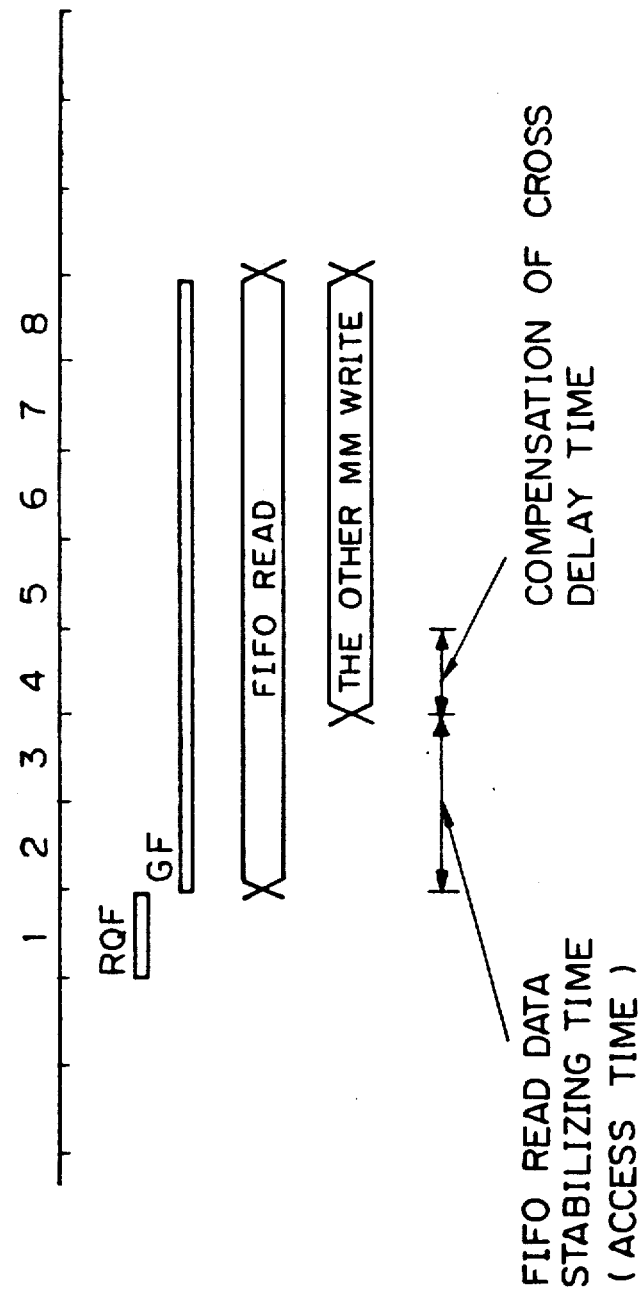

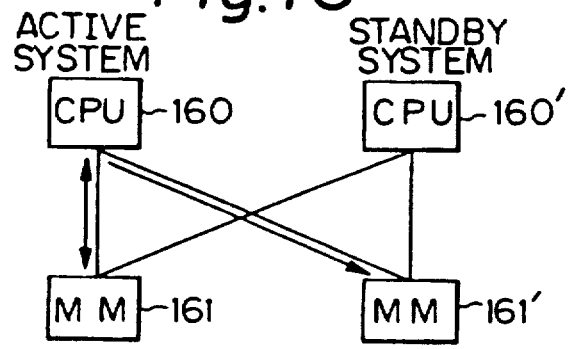
HOT STANDBY SYSTEM OF PRIOR ART
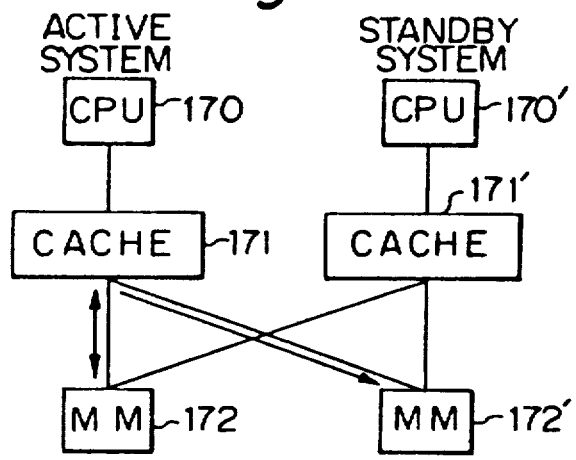
ONE EXAMPLE OF DUAL SYSTEM OF PRIOR ART INCLUDING CACHE MEMORIES
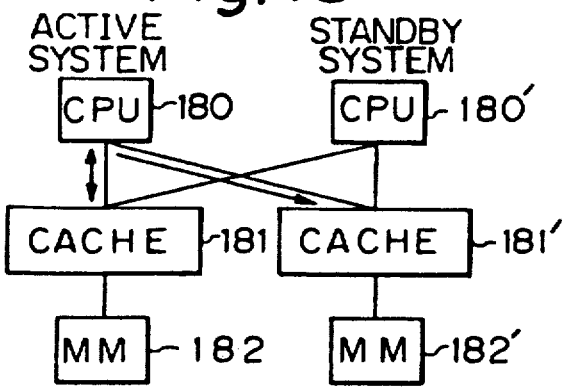
ANOTHER EXAMPLE OF DUAL SYSTEM OF PRIOR ART INCLUDING CACHE MEMORIES

HOT STANDBY MEMORY COPY SYSTEM

BACKGROUND OF THE INVENTION

1. Field of the Invention

The present invention relates to an electronic exchange with a hot standby memory copy system including main storage devices that are duplexed.

The hot standby system including the duplexed main storage or main memory devices (hereinafter called MMs) is a system conventionally used in an electronic exchange. In the hot standby system, a writing operation is carried out by a current central processing unit (hereinafter called the CPU) using both MMs, while a reading operation is performed with one of the MMs. A feature of this system is that the contents of both MMs are guaranteed to be equal to each other. When an abnormality of the MM is detected (for example, detection of a parity error, a two-bit error, etc.), the read MM is switched to the other MM to enable a current process to be continued, and accordingly, compared to a system used in a general computer where a portion after a check point is re-tried, the system can be started quicker.

In such a hot standby system, by using elements having high operation speeds, a machine cycle of the CPU may be shortened, but an access time to the MMs is still long, and thus a problem arises related to an imbalance between an operation speed of the CPU and the access time to the MMs.

To solve the above-mentioned imbalance, a cache memory is arranged between the CPU and the MM so that, if the cache memory contains address contents requested by the CPU, that is, if the cache memory hits the required contents, data is read from the cache memory but not from the MM, and if it does not hit (miss) the required contents, the contents of the cache memory that are least frequently used are updated or replaced.

There are two modes of use of the cache memory i.e., a write through mode and a copy back mode.

In the write through mode, whenever the CPU requests an update of the contents of the memory, the cache memory as well as the MM are updated. Since data is not saved from the MM to the cache memory, control is simple, but a drawback arises in that positive effects of the cache memory are demonstrated only during a reading operation.

In the copy back mode, whenever the CPU requests an update of the contents of the memory, only the contents of the cache memory are updated, and thus it is appropriate for a high-speed operation. But, a saving operation from the MM with respect to the cache memory is required, and a problem arises in that the control related to this operation is complicated.

In a system using the cache memory, a memory copy system is needed to make the best use of the high-speed of the cache memory.

2. Description of the Related Art

FIG. 16 is a block diagram for explaining a conventional hot standby system with duplexed CPUs and MMs but without a cache memory. In the figure, a CPU 160 and an MM 161 belong to a current system and a CPU 160' and an MM 161' belong to a standby system. In this system, there is no cache memory so that, even if the speed of the CPUs is increased, an access speed with respect to the MMs is still slow, and thus the problem arises in that a processing capacity of the system as a whole is not improved. Further, if high speed MMs are provided to improve the processing capacity of the whole system, the costs will be increased.

FIG. 17 is a block diagram showing an example of a conventional dual system using duplexed CPUs and MMs with cache memories. In the figure, a CPU 170, a cache memory 171, and an MM 172 belong to a current system, and a CPU 170', a cache memory 171', and an MM 172' belong to a standby system. According to this conventional example, the cache memories constitute part of the CPUs, and the current cache memory 171 is connected to the current MM 172 and standby MM 172', and similarly, the standby cache memory 171' is connected to the standby MM 172' and current MM 172.

To use the system of FIG. 17 in the copy back mode, the CPU carries out writing and reading operations to and from the cache memory so that the processing speed is improved. But, in response to a memory contents updating request from the CPU, the contents of only the cache memory are updated so that the cache memory may have data that does not exist in the MMs. Therefore, although the contents of the MMs 172 and 172' are always the same, the contents of the cache memory 171 may differ from that of the cache memory 171'. Therefore, if the current CPU is switched to the standby CPU due to a fault in the cache memory 171, data existing only in the current cache memory is lost, and thus the hot standby mode is not realized.

It is possible to apply the system shown in FIG. 17 to the write through mode. According to the write through mode, a writing operation is carried out simultaneously to both the MMs through the cache memory, so that the problem of the copy back mode wherein data exist only in the cache memory, will not occur.

The duplexed CPUs and MMs, however, are generally connected to separate power supply systems so that buffer gates, etc., are inserted in the cross connections between the cache memories and the MMs. Therefore, to write data from the CPU to both the MMs by passing through the cache memory, the necessary access time for the other system is longer than the necessary access time for the current system, due to delays in the buffer gates and cables, etc., of the cross connections.

For example, assume that the main storage comprises a memory having a cycle time of 180 ns and that a cycle time of 200 ns the main storage for the current system. But, with respect to the other system, the above-mentioned additional delays are added and, if the delays are 20 ns at the gates and 5 ns at the cables, the actual cycle time will be 225 ns. Namely, a loss due to the cross connections will be 10% or more.

The delay due to the cross connections may not always decrease a processing capacity of the CPU, but if it is assumed that it will affect half thereof, about 5% of the processing capacity is affected. It is very difficult to increase the processing capacity or speed of the CPU by 5%, and therefore, it is very important to prevent a decrease of the processing capacity caused by the cross connections.

FIG. 18 is a block diagram showing another example of the conventional duel system including duplexed CPUs and MMs employing cache memories. In the figure, a CPU 180, a cache memory 181, and an MM 182 belong to a current system, and a CPU 180', a cache memory 181', and an MM 182' belong to a standby system. In this prior art example, the cache memories are part of the MMs. respectively. The current CPU 180 is connected to the current and standby cache memories 181 and 181′, and similarly. the standby CPU 180′ is connected to the standby and current cache memories 181′ and 181.

This example is used for the copy back mode and is a hot standby system. but since cross connections exist between the CPUs and the cache memories, the high speed of the cache memories is not properly utilized.

Namely, it is necessary to synchronize the hits and misses of both cache memories, but due to the length of a bus from the current CPU to the other cache memory and a delay time of a buffer memory at an input portion of the cache memory, an access time from the CPU to the current cache memory is delayed, and as a result, the cache access speed is lowered. Since the speeds of the CPUs and cache memories tend to be increased, the cross connection delay of the arrangement shown in the figure reaches 20% to 50% of the cache memory access time.

SUMMARY OF THE INVENTION

An object of the present invention is to provide a hot standby memory copy system that improves the processing capacity of central processing units and makes the best use of the high speed of the cache memories.

To attain the above object, there is provided, according to the present invention, a hot standby memory copy system in an information processing system provided with: central processing units that are duplexed; main storage devices that are duplexed; and cache memories that are duplexed and disposed between the central processing units and the main storage devices. The hot standby memory copy system comprises: first-in first-out memories that are duplexed and connected to the central processing units; a unit for writing data, when the data is written from the central processing unit into the cache memory, and simultaneously, into the first-in first-out memory; and a unit for writing, independently of the operation of the central processing unit. the contents of one of an actively used first-in first-out memory into a standby memory of the main storage devices.

BRIEF DESCRIPTION OF THE DRAWINGS

The above object and features of the present invention will be more apparent from the following description of the preferred embodiments with reference to the drawings wherein:

FIG. 14 is a time chart showing differences in an MM access timing of an FIFO a normal state and in a fault state;

FIG. 15 is a time chart showing a data transfer timing from an FIFO to an MM of the standby system;

FIG. 16 is a block diagram explaining a conventional hot standby system with CPUs and MMs that are duplexed respectively, without cache memories;

FIG. 17 is a block diagram showing an example of a conventional dual system with cache memories; and FIG. 18 is a block diagram showing another example of the conventional dual system with cache memories.

DESCRIPTION OF THE PREFERRED EMBODIMENTS

Figure 1:
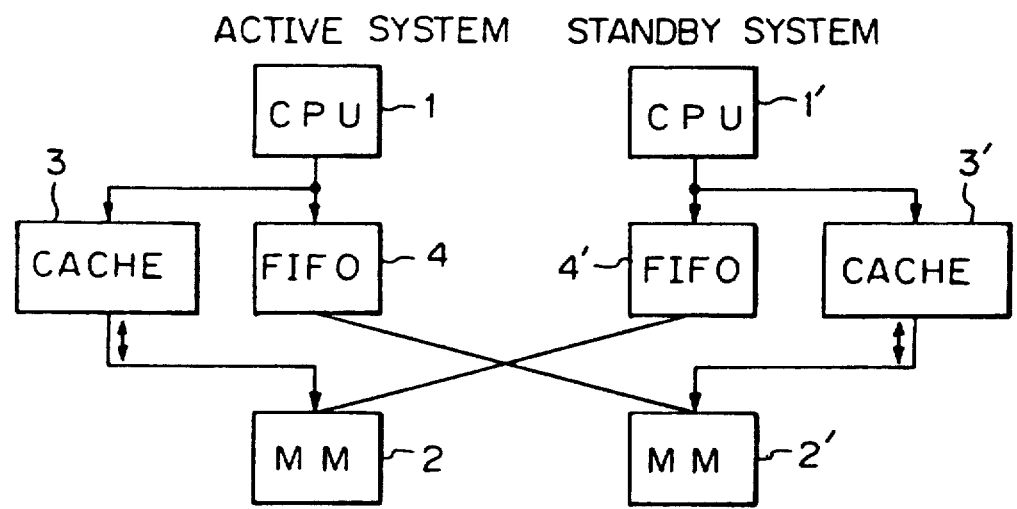
FIG. 1 is a basic explanatory view of an embodiment of the present invention.

FIG. 1 is a basic explanatory view of an embodiment of the present invention. In the figure, numerals 1 and 1′ are central processing units that are duplexed, 2 and 2′ are main storage devices that are duplexed, and 3 and 3′ are cache memories that are duplexed and disposed between the central processing units 1 and 1′ and the main storage devices 2 and 2′. The central processing units 1 and 1′ are connected to first-in first-out memories 4 and 4′ that are duplexed. Means is provided for simultaneously writing data, when the central processing unit 1 writes the data into the cache memory 3. into the first-in first-out memory 4, and means is provided for writing the contents of the current first-in first-out memory 4 into the standby main storage device 2′, independently of an operation of the central processing unit 1.

First-in first-out memories are provided and, according to the autonomous reading mechanisms thereof, the same data as the data written into the current cache memory is written into the first-in first-out memory at the same speed as the writing speed of the current cache memory. Also, according to the autonomous reading mechanism of the first-in first-out memory, the same data as the data written into the current main memory is written into the other main storage device at a data writing speed of the current main storage, so that the central processing unit does not need to consider delays due to cross connections at the time of data writing to both of the main storage devices, thereby improving the processing speed. Further, it is not necessary to consider the influence of cross connection delays at the cache memories, so that the high speed of the cache memories is properly utilized.

(1) Copy back mode

Figure 2:
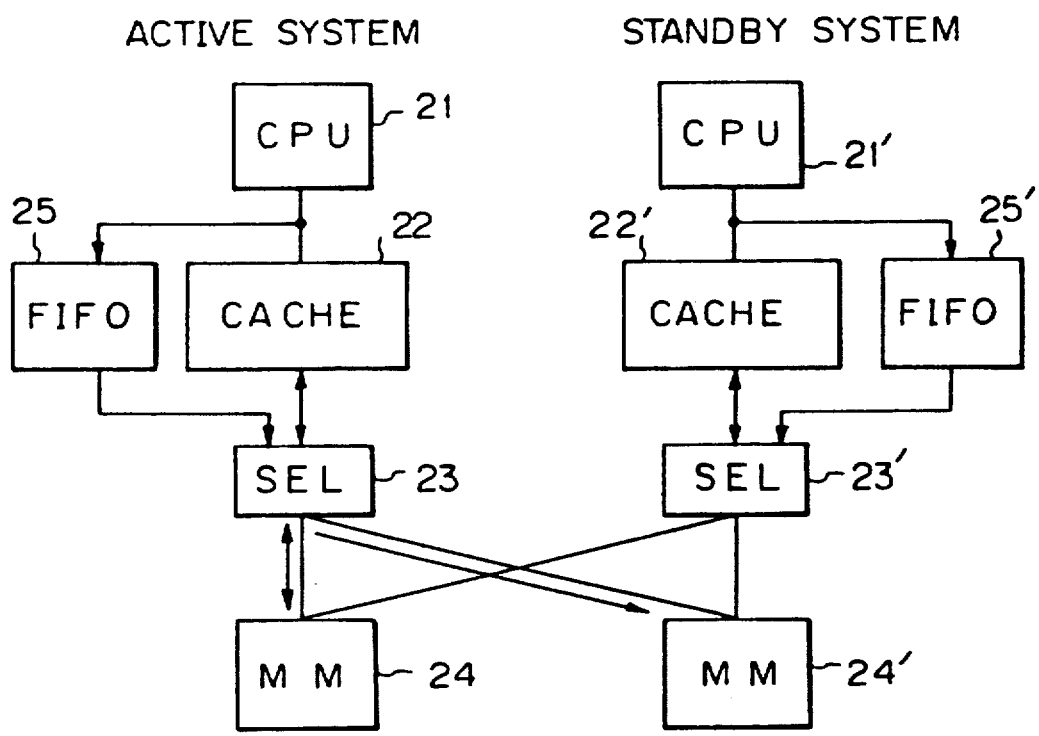
FIG. 2 is a block diagram of the embodiment of the present invention.

FIG. 2 is a principle block diagram showing a copy back mode memory copy system according to this embodiment of the present invention.

In the figure, a CPU 21, a cache memory (a high-speed buffer memory) 22, a selector (SEL) 23, and a main memory (MM) 24 constitute a current system, and a CPU 21′, a cache memory 22′, a selector (SEL) 23′, and a main memory (MM) 24′ constitute a standby system. To the cache memories 22 and 22′, first-in first-out memories (hereinafter called as FIFOs) 25 and 25′ are connected in parallel, respectively. The FIFOs 25 and 25′ have a writing speed substantially equal to that of the cache memories, and may be commercially available FIFOs or formed with gate arrays etc. The FIFOs 25 and 25' are disposed in the vicinity of the cache memories 22 and 22', respectively.

In FIG. 2, when data must be written in the cache memory 22, the current CPU 21 writes the data into the cache memory 22 and, simultaneously, into the FIFO 25. At the time of a cache hit, the selector (SEL) 23 selects an output of the FIFO 25. The data once written in the FIFO 25 is written in both of the MMs after the FIFO 25 autonomously occupies an MM bus.

Data write instructions from the CPU 21 to the cache memory 22 and FIFO 25 are generally not continuous, and the percentage of store instructions to all instructions is only 20% to 30% at the highest. Writing from the FIFO 25 to the MMs 24 and 24' is periodically carried out by the FIFO 25 in harmony with an access speed of the MMs, and therefore, if an interval of the generated store instructions is longer than a transfer interval of data from the FIFO 25 to the MMs 24 and 24', a capacity of each FIFO may be a finite value. Namely, the capacity of the FIFO will not be infinite but can be set to a proper value.

The FIFOs having a writing speed substantially equal to that of the cache memories are arranged adjacent to the cache memories, and writing is carried out from the FIFO to both of the MMs in harmony with the access speed of the MMs. Therefore, the difference between the access speeds of the cache memory and the MM can be absorbed or compensated.

In addition, the same data is written in the cache memory and FIFO. Therefore, even if a failure occurs in the cache memory, the contents of the FIFO are transferred to both of the MMs so that the contents of both of the MMs coincide with each other to prevent a loss of the data.

As described above, according to this embodiment, the MMs of the hot standby system can be restarted at a high speed, and the reliability is improved.

Figure 3:
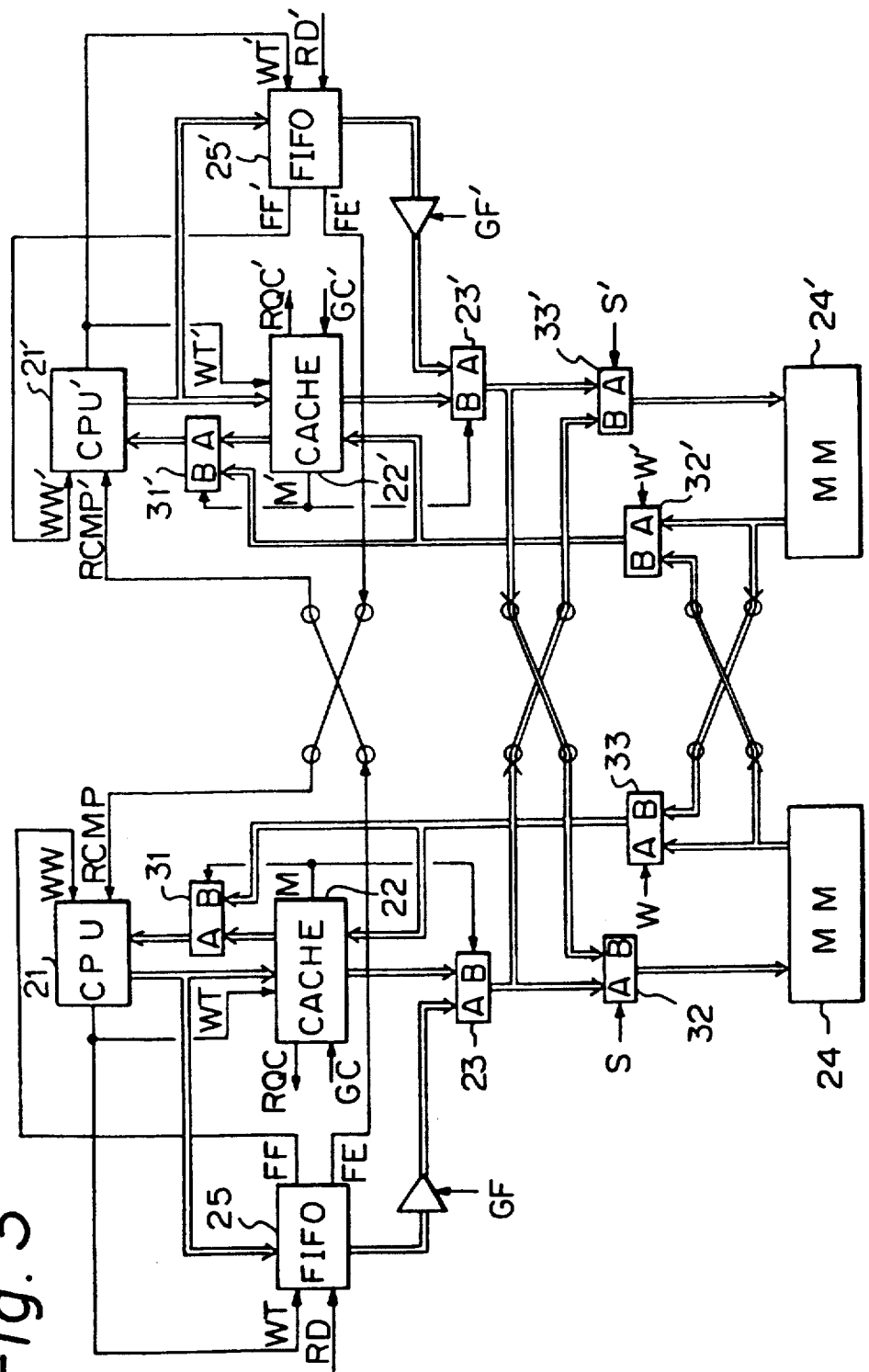
FIG. 3 is a block diagram showing the details of the embodiment of FIG. 2.

FIG. 3 is a block diagram showing the details of the embodiment of FIG. 2. In the figure, the same parts as those shown in FIG. 2 are represented by the same reference marks. Numerals 31, 32, and 33 are 2 to 1 selectors that select and output A or B depending on whether signals M, S, and W are 0 or 1, respectively. Numerals 31' 32' and 33' are standby 2 to 1 selectors.

It is assumed that the CPU 21 is in active use and CPU 21' is on standby; and the MM 24 the main one, and the MM 24' a slave one (writing only).

The cache memory 22 stores data read from the MM 24. When the CPU 21 reads data out of the cache memory 22 to process the data and when the processed data is restored into the original address of the cache memory 22, a write signal WT generated in the CPU 21 is given to the FIFO 25 so that the data is written into the cache memory 22 and into the FIFO 25 simultaneously. As mentioned before, the FIFO 25 is arranged in the vicinity of the cache memory 22 so that a delay time from the CPU 21 to the FIFO 25 is short, and a capacity of the FIFO may be of a proper finite value.

When a cache miss occurs at the time of writing data from the CPU 21 into the cache memory 22, namely, when a write address from the CPU 21 does not coincide with an address of the data stored in the cache memory 22, the 2 to 1 selector (SEL) 23 switches from an FIFO output to a cache memory output to save the data written in the cache memory 22 into the MM 24. At this time, the cache memory 22 generates a bus request signal RQC to request an MM access request competition circuit (MMCTL) shown in FIG. 4 to request the MM bus. After that, if an enabling signal GG is returned as an output of the MMCTL, the cache memory 22 can use the MM bus so that the data are saved from the cache memory 22 into the MM 24. The way of picking up data to be saved is exactly the same as that of a known copy back mode and thus is omitted from the description FIG. 3.

Figure 4:
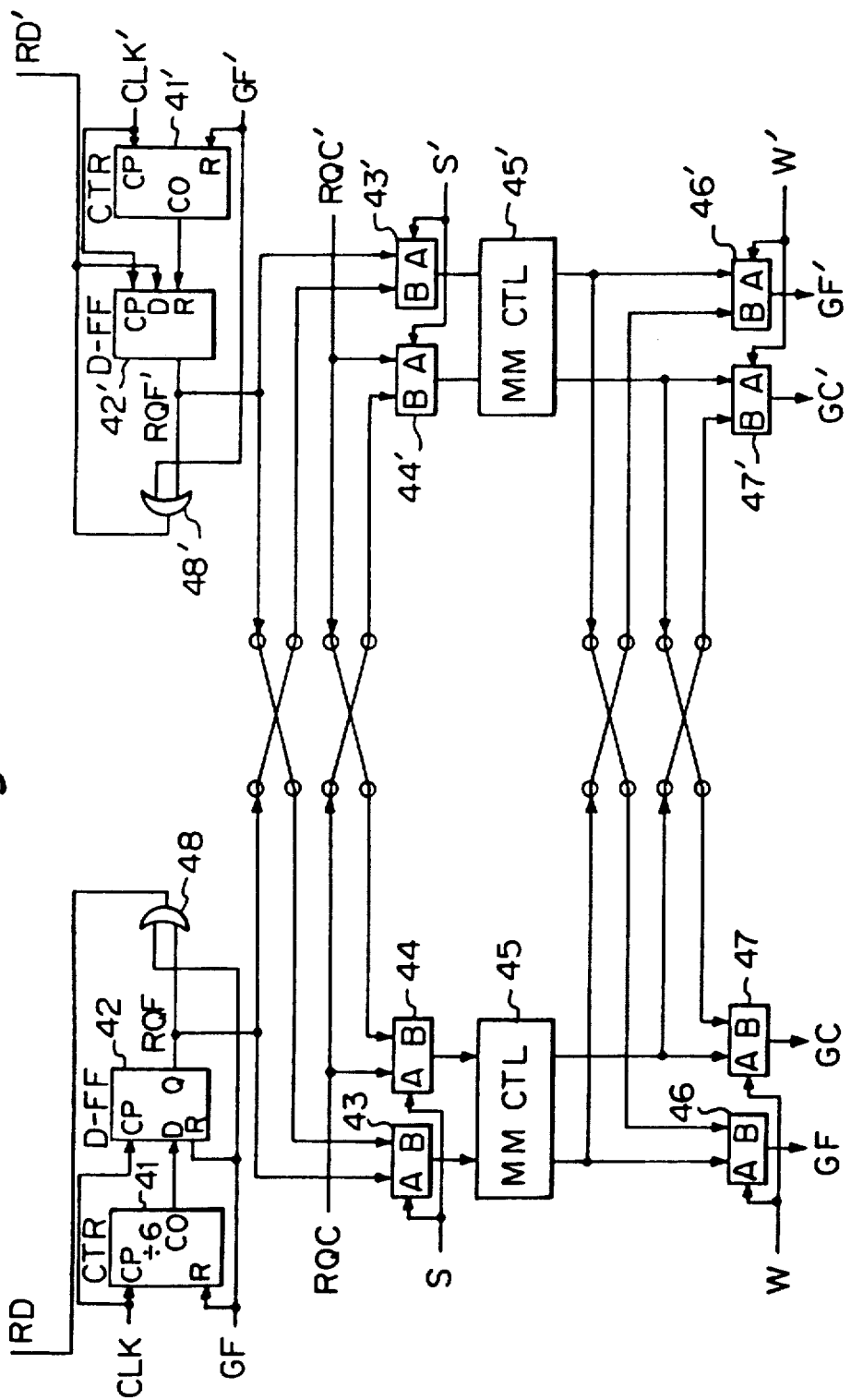
FIG. 4 is an explanatory block diagram of various control signals used in the embodiment of FIG. 3.

On the other hand, the data written in the FIFO 25 is autonomously written into the MMs 24 and 24' regardless of a hit or miss in the cache memory 22. A writing operation from the FIFO 25 to the MMs 24 and 24' will be explained with reference to FIG. 4. FIG. 4 is an explanatory block diagram showing various control signals used in the embodiment of FIG. 3. In the figure, numerals 41 and 41' are counters that cycially repeat 0, 1, ... and 5 to generate an output CO at "5", 42 and 42' are D-type flip-flops, 43, 43', 44, 44' 46, 46', 47, and 47' are 2 to 1 selectors 45 and 45' are memory access competition circuits (MMCTL), and 48 and 48' are OR gates.

Figure 5:
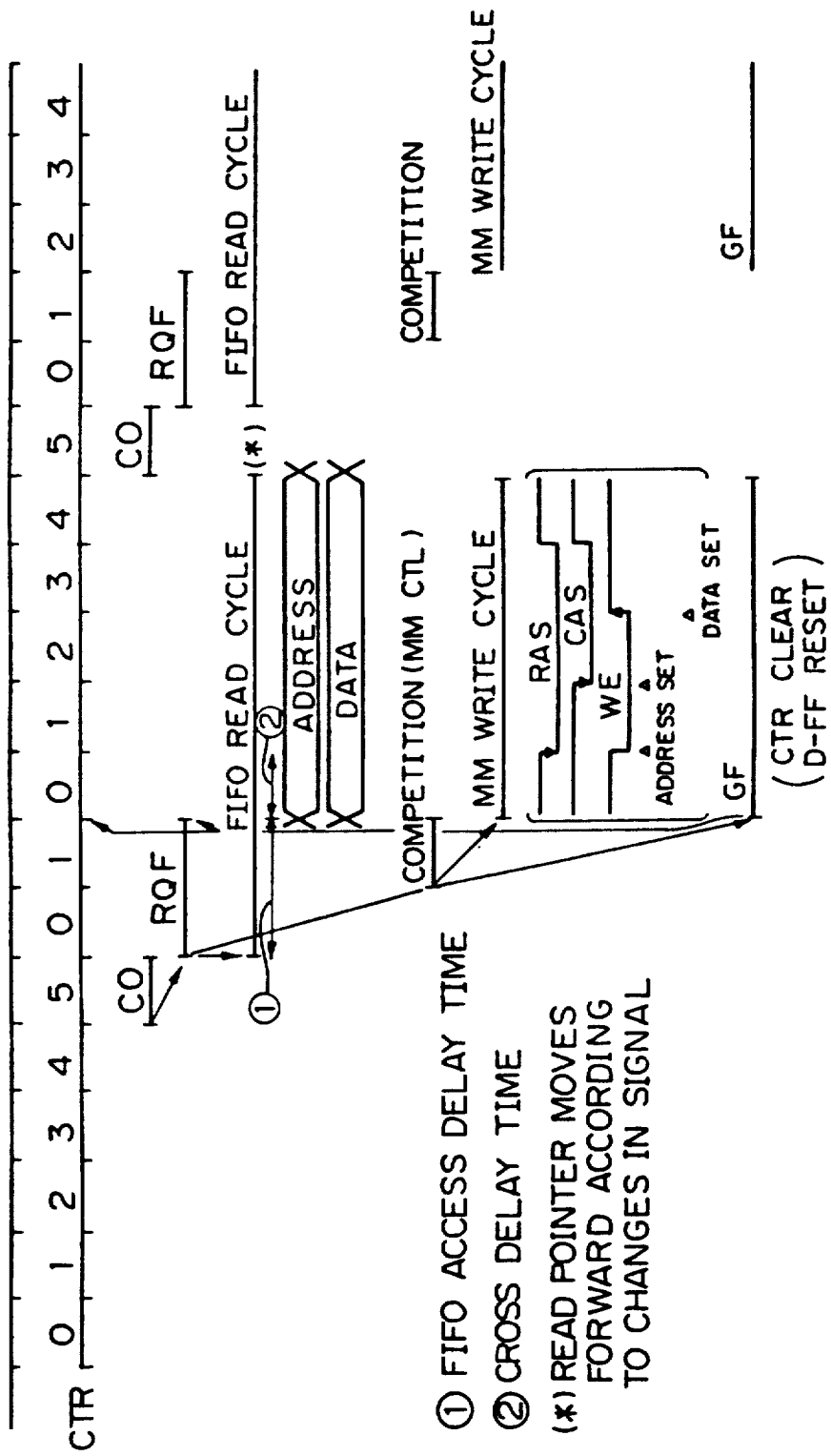
FIG. 5 is a timing chart of an example of a transfer operation from an FIFO to an MM.

An example of a data transfer operation from the FIFO 25 to the MM 25 as shown in FIGS. 3 and 4 will be explained with reference to a timing chart of FIG. 5. When an enabling signal GF is provided to a reset terminal R of the counter (CTR) 41, the counter 41 is cleared. Since the enabling signal GF is supplied to a D-input of the D-FF 42 through the OR gate 48, the D-FF 42 is in a reset state during the generation of the signal GF. The enabling signal GF becomes a read signal RD of the FIFO 25 through the OR gate 48.

After being cleared, the counter 41 counts clock signals CLK to generate an output CO when the count value becomes "5". The signal CO is input to a reset terminal R of the D-FF 42 so that an MM bus request signal RQF is obtained at an output Q of the D-FF 42. The signal RQF passes through the OR gate 48 and is input as a read signal RD to the FIFO 25. An interval 1 during which the signal RQF is being output forms part of a data read cycle from the FIFO 25 so that a delay time will be needed for accessing the FIFO 25.

On the other hand, if the control signal S provided to the 2 to 1 selector 43 is "0 " to indicate a current system selection, the signal RQF is input to the MM access request competition circuit (MMCTL) 45 through the 2 to 1 selector 43. The MMCTL 45 outputs an enabling signal GF if the MM bus is available. If the control signal W of the 2 to 1 selector 46 is "0," the signal GF is supplied to a reset terminal R of the counter 41 through the 2 to 1 selector 46 to clear the count value of the counter 41, and as a result, the signal CO disappears to turn OFF the signal RQF. But, since the signal GF has become the signal RD through the OR gate 48, the FIFO 25 continues the reading cycle until just before the count value of the counter 41 becomes "5." A predetermined interval 2 in the reading cycle after the signal RQF is turned OFF is a cross connection delay time between the FIFO and the MM, and thus the address and data are read out of the FIFO 25. In the next reading cycle, a read pointer of the FIFO is advanced.

On the other hand, due to the signal RQF provided to the MMCTL 45 in the interval 1 , the MMCTL 45 generates the enabling signal GF and, at this time, expects an arrival of read data from the FIFO 25 and starts a writing sequence with respect to the MMs 24 and 24'. This writing sequence itself is based on a known technique, and generates a row address strobe RAS), a column address strobe (CAS) and a write enable (WE) during the generation of the signal GF, to write the address and data. To make the data from the FIFO 25 reach the MMs 24 and 24' simultaneously at the time of writing, control signals S and S' of the 2 to 1 selectors 32 and 32' are set in advance.

The 2 to 1 selectors 43 and 44 on the input side of the MMCTL 45 distribute request signals RQF and RQC to both the systems, and the 2 to 1 selectors 46 and 47 on the output side return the enabling signals GF and GC. These 2 to 1 selectors themselves are well known.

In the above explanation, it was assumed that the CPU 21 may write data into the cache memory 22 as well as into the FIFO, but that a writing speed with respect to the FIFO 25 is faster than a reading speed with respect to the FIFO 25, so that the contents of the FIFO 25 are not always empty at the time of writing from the CPU 21. If data is to be written into the cache memory 22 when the FIFO 25 is full of data, the data may be written only into the cache memory 22. To avoid this problem, the FIFO 25 outputs a signal FF to warn that the FIFO is full of data. This signal is provided as a write waiting signal WW to the CPU 21 so that a queuing mode for the writing operation of the CPU is effected. If the probability of the queuing mode, i.e., waiting at the CPU, is high, this will be a problem, but it is generally known that the probability can be lowered if the capacity of the FIFO is properly selected.

Next, switching the current CPU to the standby CPU' will be described. For example, this switching may be carried out responsive to a switching command when a defective package in the current system is replaced, or may be carried out at the time of detecting a fault in the CPU. At first, the switching carried out responsive to the command will be explained. If the switching is done when data to be written in the MMs 25 and 25' exist in the FIFO 25, the data in the FIFO 25 may be lost. To avoid this, when a switching instruction based on the command is generated, before switching to the CPU' 21 a check to made to see whether or not the FIFO 25 is empty. Namely, when the FIFO 25 is empty, the FIFO 25 outputs an FE signal. The CPU' 21' becomes a current system only after receiving the FE signal as a read completion signal RCMP' of the FIFO. Namely, the CPU' 21' will become be the current system until receiving the signal RCMP' is received.

When the current CPU is changed from the CPU 21 to the CPU' 21' due to a failure, the following procedure will be performed. If a watchdog timer (not shown) detects an abnormality in the software of the CPU, a restarting circuit not shown (including microprograms) switches the CPUs. In this case, if a cause of the failure is in the CPU or in the cache memory, data exists in the FIFO 25 so that the data of the FIFO is transferred to both of the MMs in the same manner as that for a normal case, i.e., without a failure. After the completion of the transfer of data, the standby CPU' 21' is started as a new current system. If the cause of the failure is in the FIFO, all data in the cache memory 22 that does not match data in the MM 24 is saved in both the MMs from the cache memory 22 according to a write instruction bit of the cache memory 22. This procedure is the same as that for a single CPU system and is well known. After the completion of the saving, the standby CPU is started as the new current or active CPU.

Figure 6:
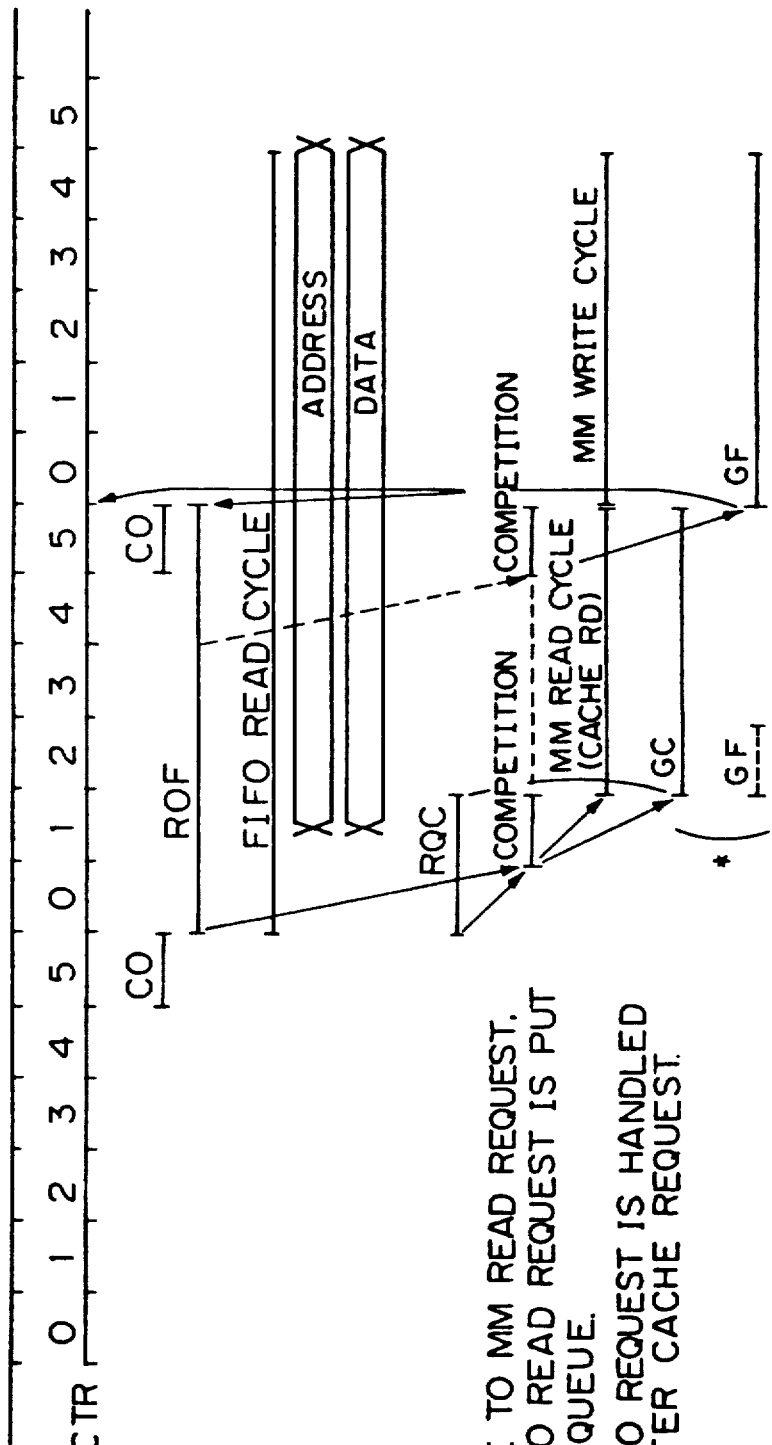
FIG. 6 is a timing chart of another example of the transfer operation from the FIFO to the MM.

The reading from the FIFO 25 is suspended when a cache miss occurs to cause the CPU 21 to read the contents of the MM 24. This will be explained with reference to a timing chart of FIG. 6. In FIGS. 3, 4, and 6, when the MM bus request signal RQF is output from the D-type flip-flop 42 in response to the output CO from the counter 41, and when the MM bus request signal RQC is simultaneously output from the cache memory 22, the MMCTL 45 gives priority to the signal RQC, to resolve the competition, and provides the enabling signal GC to the cache memory 22. After a reading cycle of the MM 24 is completed, the enabling signal GF is output such that the address and data are read from the FIFO 25 into the MMs. Namely, while the enabling signal GC is being output, the reading from the FIFO 25 is suspended.

Figure 7:
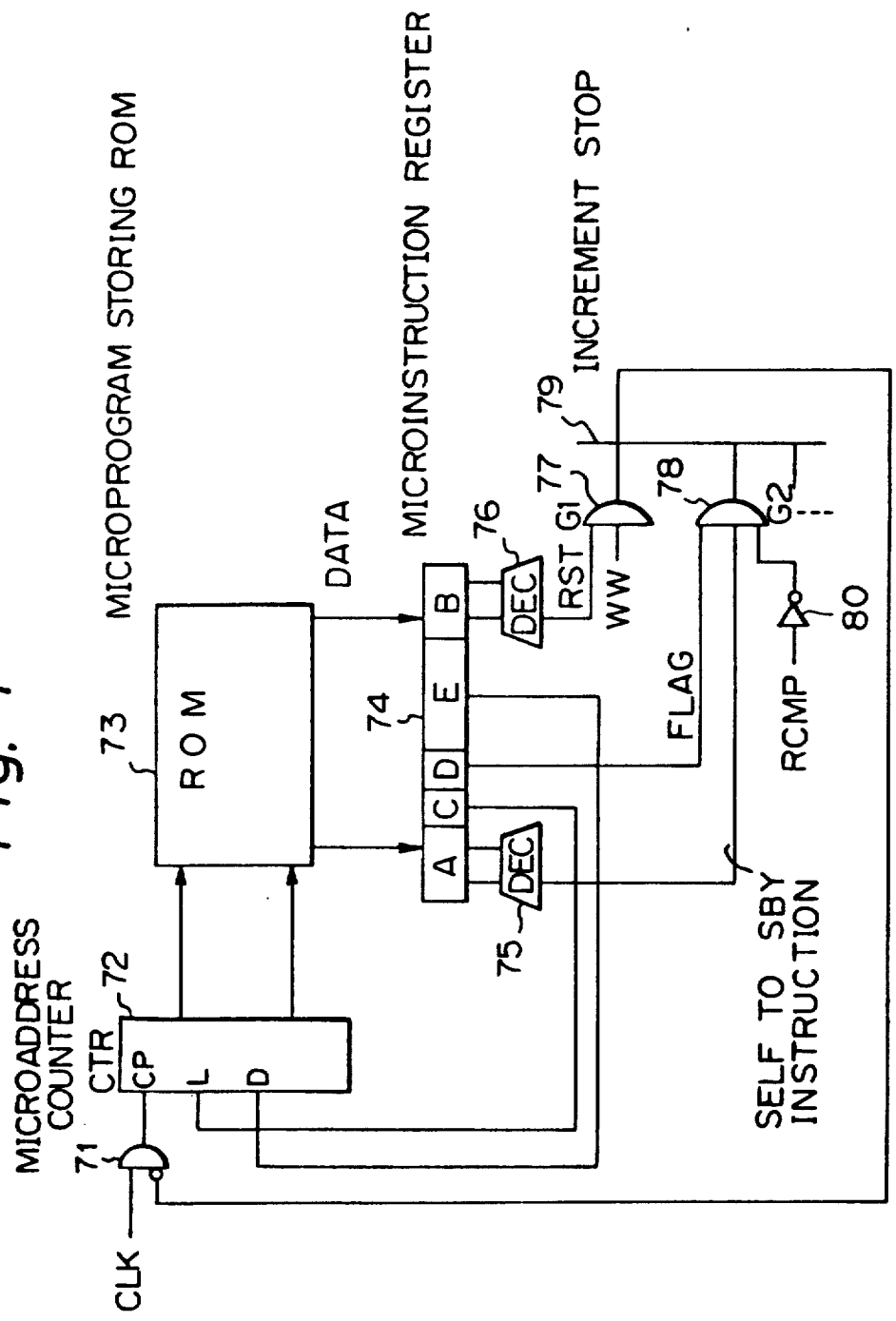
FIG. 7 is a circuit diagram showing an example of a queuing circuit.

FIG. 7 is a circuit diagram showing an example of a queuing circuit for queuing the writing operation of the CPU 21 in response to the write waiting signal WW. In the Figure, 71 is an AND gate, 72 is a microaddress counter, 73 is a microprogram storing ROM, 74 is a microinstruction register, 75 and 76 are decoders, 77 and 78 are AND gates, 79 is an OR gate, and 80 is an inverter. The microinstruction register 74 comprises a microprogram instruction storing portion A, a microprogram memory access specifying portion B, a microprogram instruction head microaddress set specifying portion C, a wait specifying portion D for waiting for an RCMP in a command such as a self-to-standby (SELF TO STB) instruction, and a microprogram head address specifying portion E.

When an increment stopping signal is not provided from the OR gate 79, the microaddress counter 72 counts up clock signals CLK to sequentially transmit a read address. According to the address, a microprogram is read from the ROM 73 and stored in the register 74. If a wait specifying flag is loaded in the portion D of the register 74, and if the self-to-standby instruction is output by decoding the portion A, and if the RCMP for indicating that the FIFO 25 is empty is "0", i.e., if the FIFO 25 is not empty, an output of the AND gate G2 is "1." This output "1" passes through the OR gate 79 and becomes an increment stopping signal. Then, the AND gate 71 is closed and the counter 72 stops counting up, and accordingly, execution of the self-to-standby instruction is suspended until the RCMP becomes "1".

If a store instruction signal PST for an operand is output as a result of decoding the portion B of the resister 74, and if the WW signal indicating that the FIFO 25 is full of data is provided, an output of the AND gate 77 becomes "1", and will be the increment stopping signal transfered through the OR gate 79. In this case, the writing from the CPU 21 to the FIFO 25 and cache memory 22 is suspended until the signal WW becomes "0", namely until the FIFO 25 is not full of data.

The incrementing of the microaddress counter 72 is stopped due to various interrupting operations. In the embodiment of the present invention, a circuit for stopping incrementing is provided with a slight addition to carry out the above-mentioned queuing.

As described above, when switching the active CPU to the standby CPU, the switching is suspended until the data in the FIFO is saved in both of the MMs, but this waiting time is short compared to the conventional systems that have no FIFOs. Namely, if there are no FIFOs, the CPUs are switched from one to another after saving all the contents of the cache memory 22 in both of the MMs, and thus the waiting time is long. On the other hand, in the embodiment of the present invention provided with the FIFOs, the contents of the FIFO 25 are periodically saved in the MMs so that only unprocessed data remaining in the FIFO is saved at the time of switching CPUs, thus shortening the waiting time. But, when switching at the time of a failure of the FIFO 25, the waiting time will be the same as that in the conventional system with no FIFOs.

As explained in the above, in the copy back system according to this embodiment of the present invention, FIFOs having a small capacity compared to the cache memories are added, and simple hardware is also added to enable the CPU to monitor the signal FF indicating that the FIFO is full of data and the signal FE indicating that the FIFO is empty. Thus, the MM hot standby system which is capable of starting the system including programs in a short time at the time of a failure is realized.

(2) Write through mode

Figure 8:
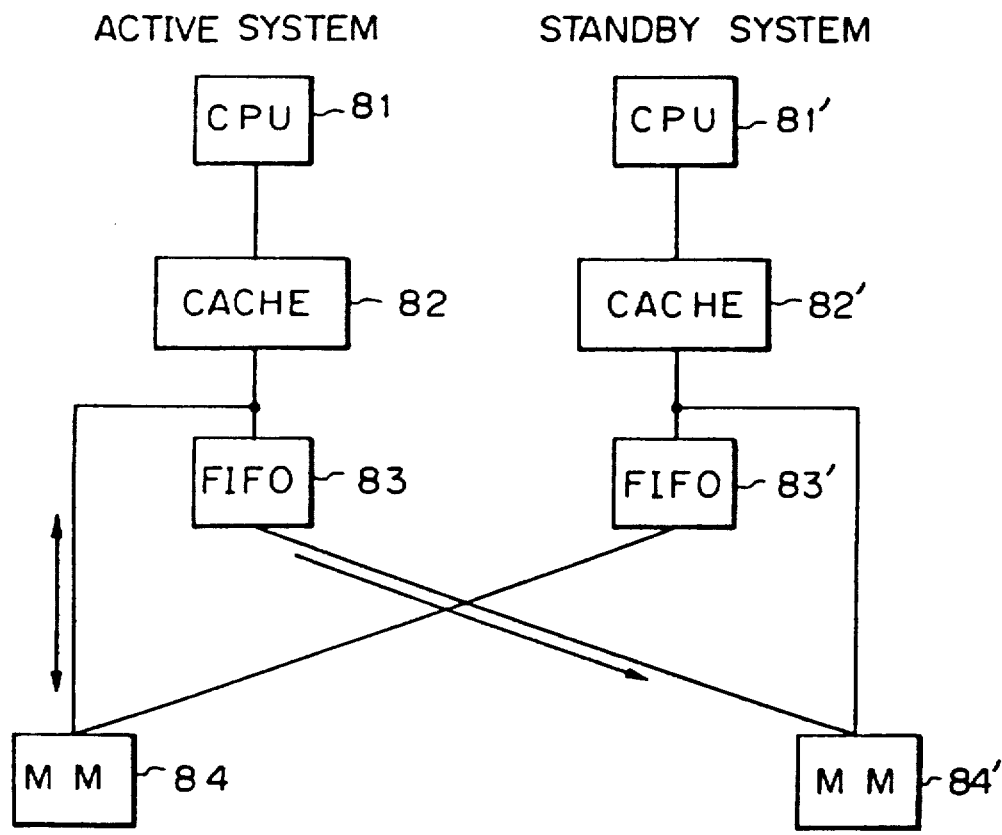
FIG. 8 is a principle block diagram of another embodiment of the invention.

FIG. 8 is a principle block diagram showing a write through mode memory copy system according to another embodiment of the present invention. In the figure, a CPU 81, a cache memory 82, an FIFO 83, and an MM 84 constitute an active system, and a CPU 81′, a cache memory 82′, an FIFO 83′, and an MM 84′ constitute a standby system.

The conventional write through mode has the FIG. 16. To solve this problem, the embodiment has the FIFOs inserted in cross connection routes. Accordingly, the CPU 81 writes data according to the write through mode into the cache memory 82 and into the current MM 84 as well as writing the data into the FIFO 83. After that, the data is written autonomously from the FIFO 83 to the other or standby MM 84′ according to a control circuit portion of the FIFO 83.

In this embodiment, the FIFO itself is in the system of the CPU so that the CPU, MM and FIFO are arranged adjacent to each other (for example, in adjacent slots on a backboard). Therefore, data writing from the CPU to the FIFO can be set to the same conditions as those conditions of data writing from the CPU to the MM, by setting a cycle time of the FIFO as equal to or faster than that of the MM. As a result, the shorter the cycle time of the MM, the greater the improvement of the processing capacity of the CPU.

On the other hand, data written in the FIFO of this embodiment is autonomously written in the other or standby MM by a peripheral circuit. Here, strictly speaking, the contents of both MMs may not coincide with each other. But, if a certain time elapses, both will coincide with each other. This is because a frequency of writing operations of the CPU with respect to the MM is about 20% to 30% of all instruction executions and because a cross connection delay time is covered by a remaining time. It is generally known that, if an average writing interval of the CPU is longer than an autonomous reading cycle time, infinite write data will not be stored in the FIFO.

This, however, is not sufficient, because waiting data in the FIFO will be lost if the CPU, MM, cache memory and FIFO are switched due to a failure. Since the capacity of the FIFO is finite, an overrun, i.e., loss of data, will occur when the CPU carries out the writing operations continuously. To cope with this, the embodiment also uses the waiting technique.

Figure 9:
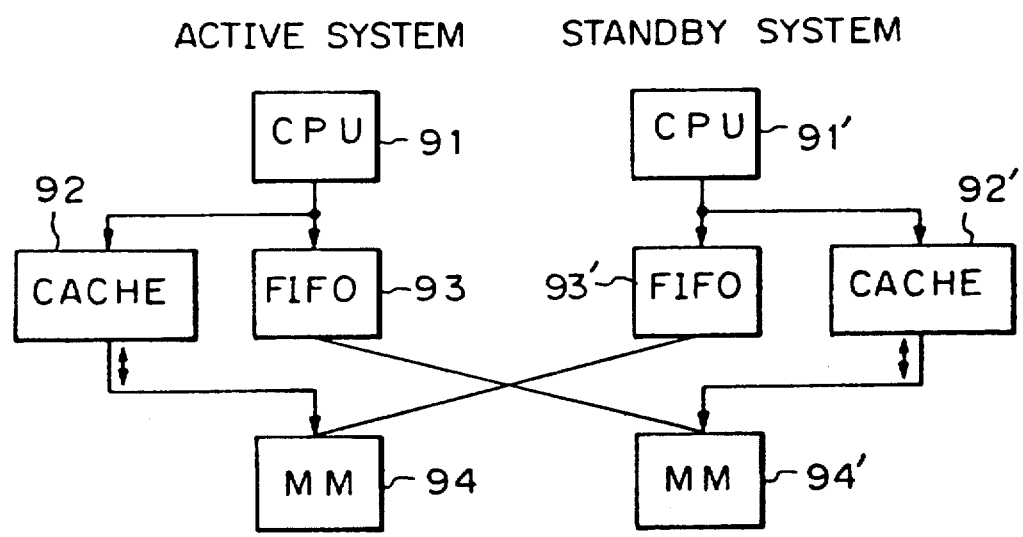
FIG. 9 principle block diagram of a modification of FIG. 8.

The CPU 81 writes data into the FIFO 83 by passing the data through the cache memory 82. Therefore, the FIFO may be directly connected to the CPU without passing through the cache memory, as shown in FIG. 9. In FIG. 9, a CPU 91, a cache memory 92, an FIFO 93, and an MM 94 belong to a current system, and a CPU 91′, a cache memory 92′, an FIFO 93′, and an MM 94′ belong to a standby system, and these operate in exactly the same manner as those shown in FIG. 8 and thus explanations thereof will be omitted.

Figure 10:
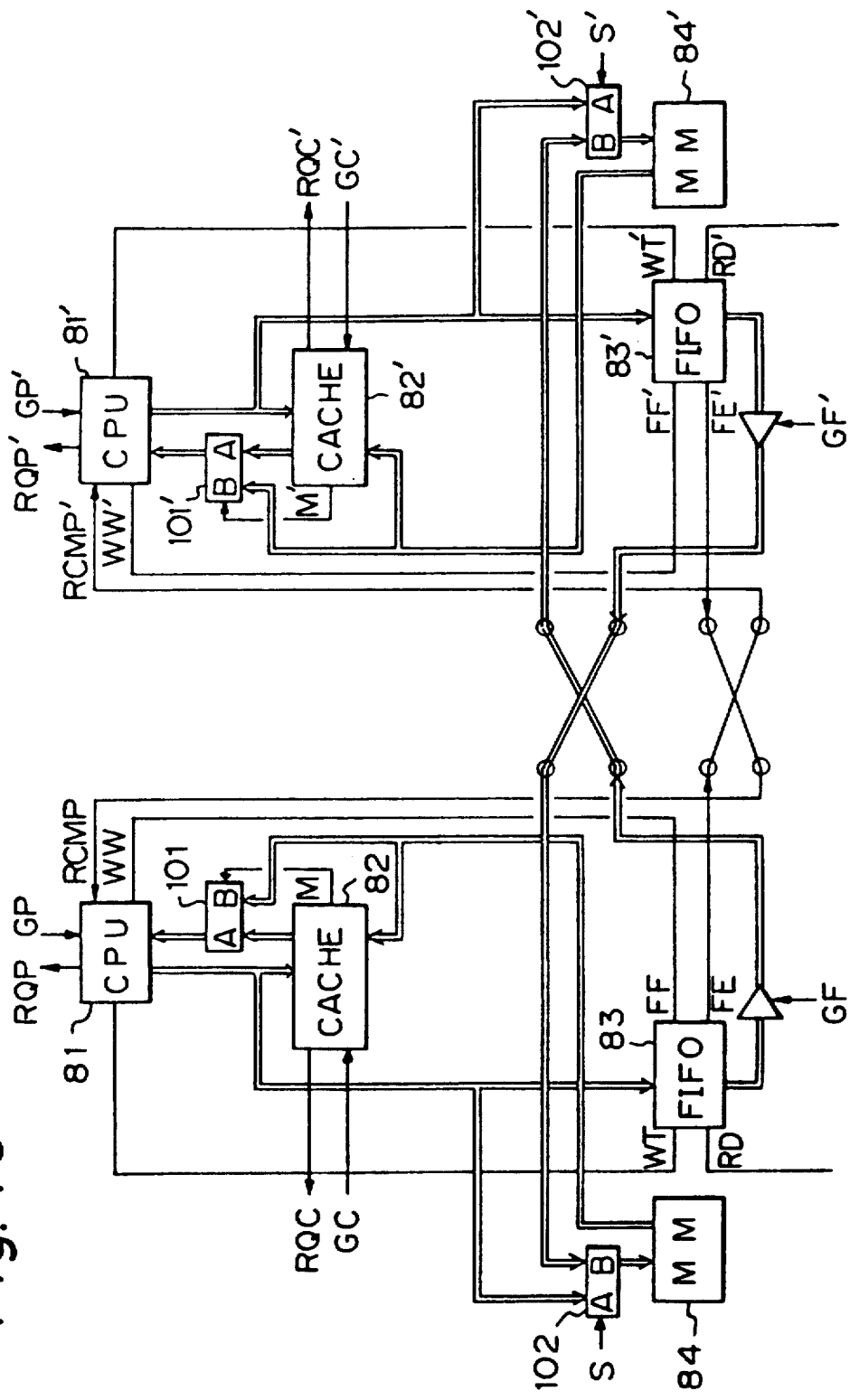
FIG. 10 is a block diagram showing the details of the embodiment of FIG. 8.

FIG. 10 is a block diagram showing the details of the embodiment of FIG. 8. In the figure, the same parts as those shown in FIG. 8 are represented by the same reference numerals. Numerals 101 and 102 are 2 to 1 selectors that selectively output A or B in response to whether signals M and S are 0 or 1, respectively, and 101′ and 102′ are 2 to 1 selectors of the standby system.

To write data into the MM 84, the CPU 81 sends an MM request RQP to a memory access competition circuit (MMCTL) 113 of the current system. If an MM access enabling signal GP is returned from the MMCTL 113 to the CPU 81, it executes a writing operation with respect to the MM 84 in the current system. While the writing operation is being executed, a write instruction signal WT is transmitted to the FIFO 83 such that data the same as that written in the MM 84 is written in the FIFO 83. The 2 to 1 selector 102 at an entrance of the MM 84 selectively receives data from the current CPU 81 or data from the other FIFO 83′. On the current CPU side, A is selected when a control signal S is 0, and on the standby CPU′ side, B is selected when the signal S is 1.

If the FIFO 83 is filled with data due to continuous data writing from the CPU 81 to the MM 84, a signal FF is output from the FIFO 83 to become a write wait instruction signal WW to be given to the CPU 81, and as a result, the writing operation is suspended. The waiting circuit is the same as that shown in FIG. 7 and thus a detailed explanation thereof will be omitted.

Figure 11:
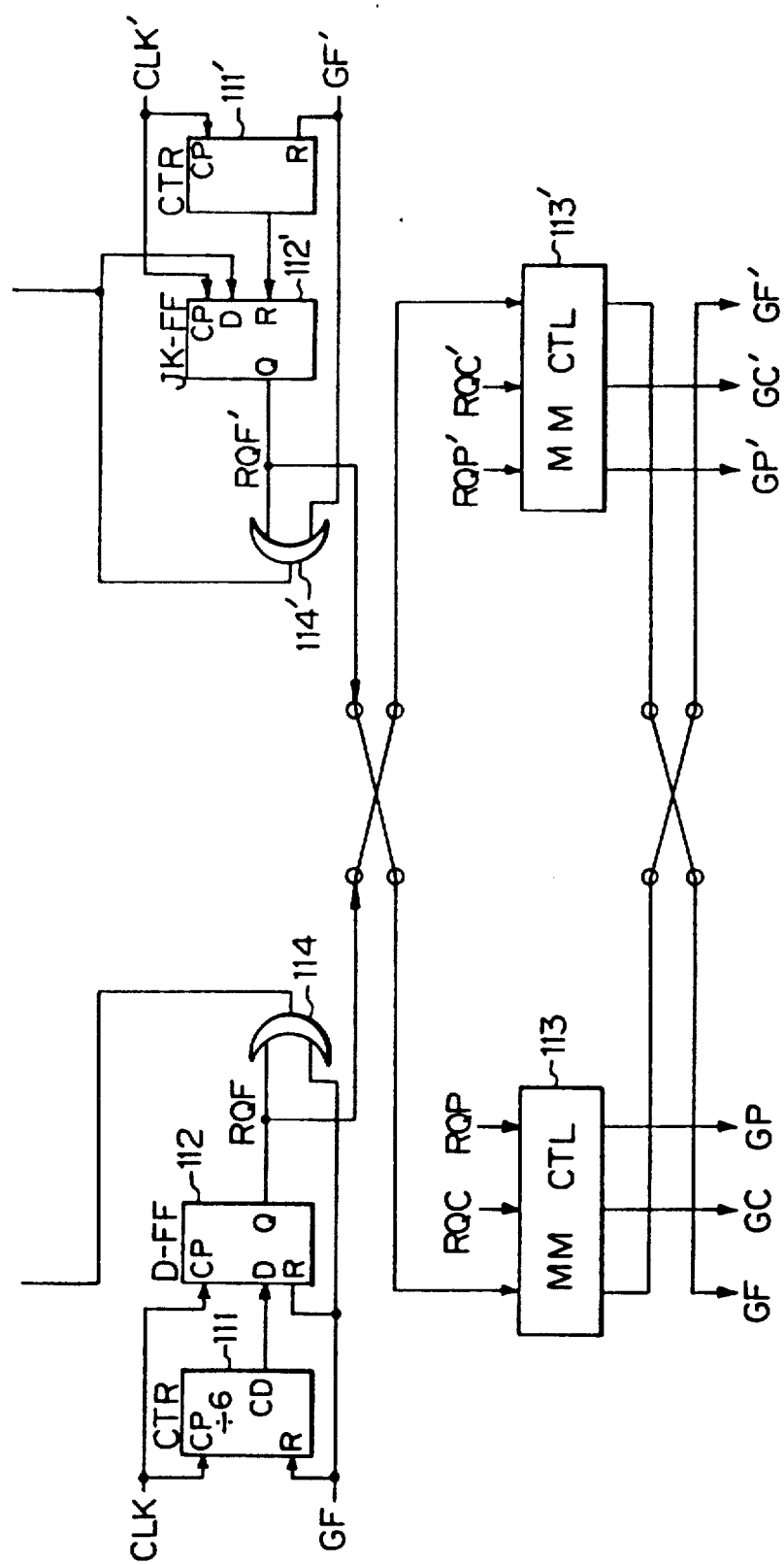
FIG. 11 is an explanatory block diagram of various control signals used in the embodiment of FIG. 10.

FIG. 11 is an explanatory block diagram of various control signals used in the embodiment of FIG. 10. In the figure, a counter (CTR) 111, a D-type flip-flop 112, a memory access competition circuit (MMCTL) 113, and an OR gate 114 are the same as those of the embodiment shown in FIG. 4, and thus a detailed explanation thereof will be omitted. For data written in the FIFO 83, the counter (CTR) 111 having a properly set initial value sends an access request RQF to the MMCTL 113′ of the other system to obtain an access enabling signal GF from the other MMCTL 113′ as a result of competition. In response to the enabling signal GF, the counter (CTR) 111 is once reset to be ready for the next FIFO reading. The signal becomes a read signal RD of the FIFO 83 through the OR gate 114, and as a result, the data read out of the FIFO 83 is written in the MM 84′ through the 2 to 1 selector 102, located at an entrance of the other MM.

At this time, the other or standby MM bus is secured, and therefore, if the other MM 84′ starts a data writing cycle, the same data as that in the MM 84 is written in the other MM 84′. When the enabling signal GF is returned, an output CO of the counter (CTR) 111 becomes 0, and the next CLK is received to reset the D-FF 112. If the cross connection delay is small, the writing from the FIFO 83 to the MM 84′ may be carried out at the same timing as that of the data writing from the current CPU to the current MM. If the cross connection delay is large, the writing operation in the current system may be executed by using two memory cycles, or a longer cycle write timing that differs from the write timing in the current system may be set because it differs from the operation of the current MM.

After the completion of the data transfer from the FIFO 83 to the other MM 84' and when not data to be transferred exists in the FIFO 83, the FIFO 83 outputs an empty signal FE to notify the other CPU 81' of this condition. This is referred to by a new active CPU when the active CPU is switched the standby CPU, and accordingly, the new active CPU can confirm that all data in the FIFO of the previous active system has been transferred to the MM of the new active system. As a result, the data will not be lost due to the switching, if the new active CPU starts operation after confirming the signal FE, i.e., a signal RCMP' (read completion).

As explained above, in the write through mode shown in FIGS. 10 and 11, the same contents are secured in both the MMs so that the hot standby system of the MM is realized to improve operations at a time of a failure.

Nevertheless, the system shown in FIGS. 10 and 11 may cause a difference between the contents of both MMs at the time of a failure of the FIFO, thus causing a disadvantage in that the hot standby is not realized. Namely, if the FIFO fails, a package of the FIFO must be replaced, etc., in an actual operation of the system. But, according to the arrangement shown in FIG. 10, the FIFO and the CPU are in the same system so that the active CPU is switched to the standby CPU when replacing the package. Nevertheless, since the contents of both the MMs are not the same, operation of the system must be stopped according to the system shown in FIGS. 10 and 11, to switch the systems from one to the other.

Figure 12:
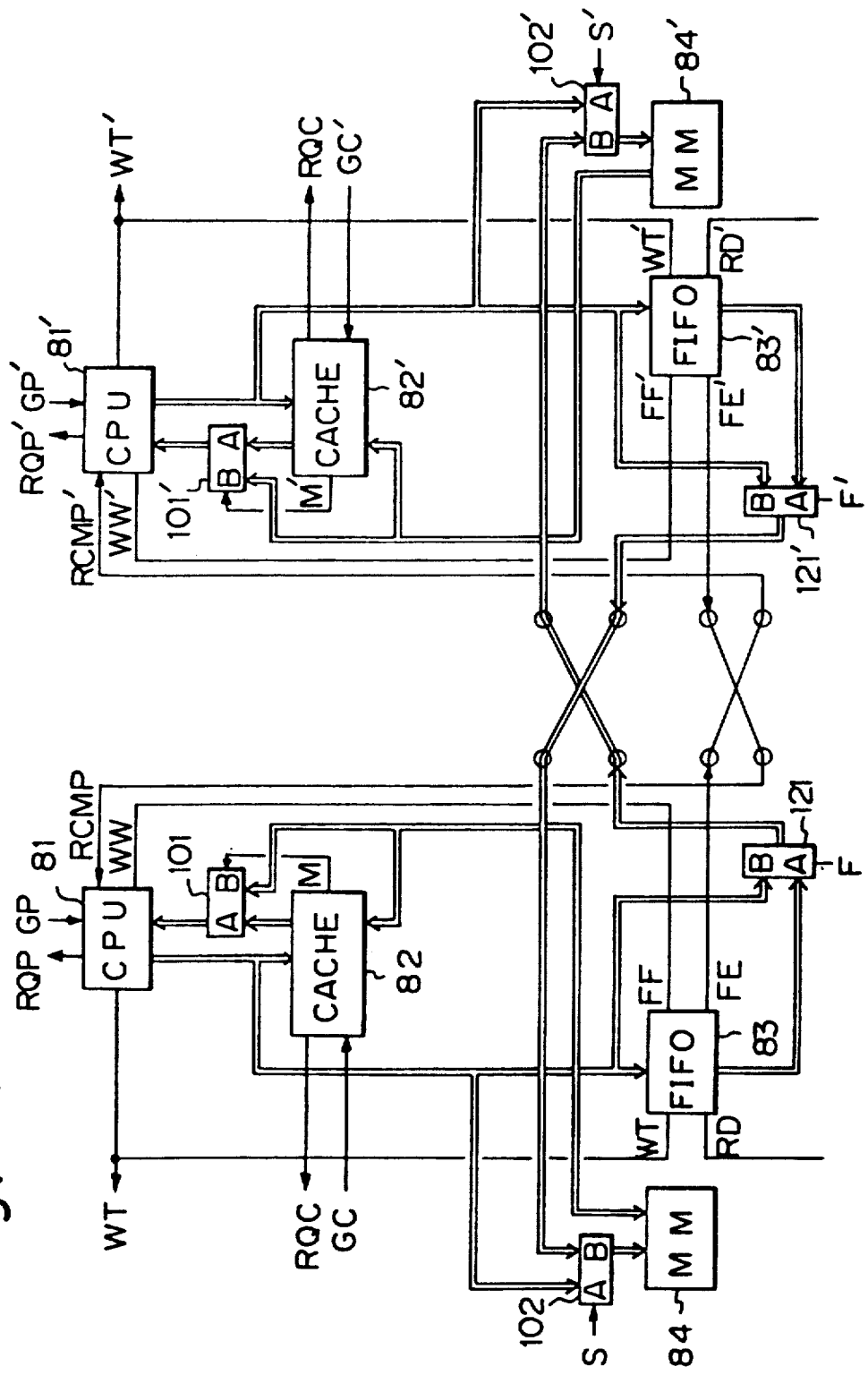
FIG. 12 is a modified block diagram of FIG. 10.
Figure 13:
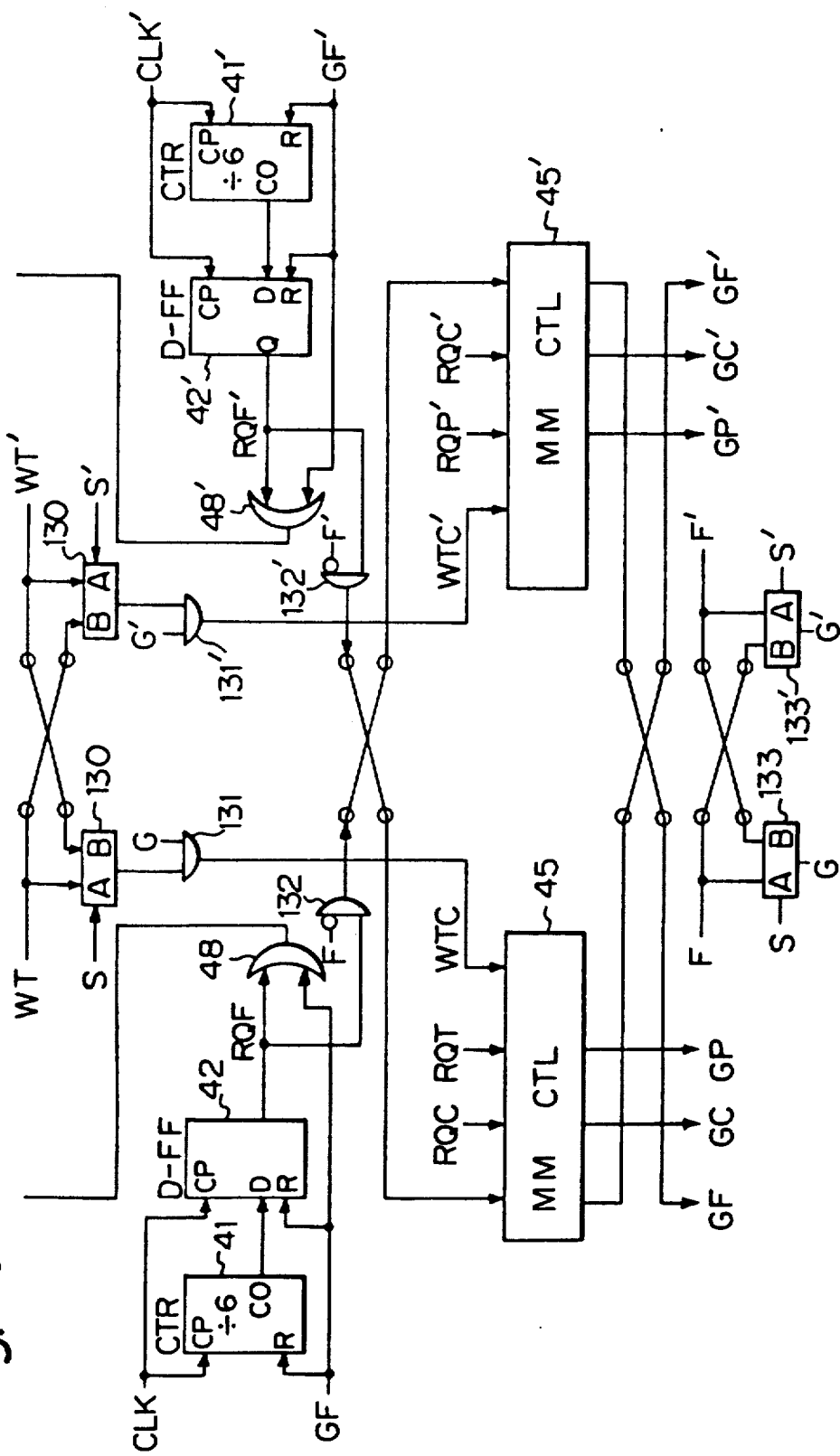
FIG. 13 is an explanatory block diagram of various control signals used in the embodiment of FIG. 12.

To avoid this problem as shown in FIGS. 12 and 13, a route is provided for bypassing an FIFO when the FIFO fails. In FIGS. 12 and 13, the same parts as those shown in FIGS. 10 and 11 are represented by the same reference numerals. Numerals 121 and 121' are 2 to 1 selectors for selecting the bypass route. To bypass the FIFO and to write data from a CPU 81 directly into a standby MM 84', a cross connection delay time must be compensated, and therefore, an MM access timing must be extended compared to that of a normal FIFO.

FIG. 14 is a time chart showing changes in the MM access timing of the FIFO in a normal state and in a failure state. As is apparent from the figure, when the FIFO is normal, the CPU 81 outputs a bus request signal RQP, and in response to this, if an enabling signal GP is returned from an MM-CTL 45, data is written into a current MM 84 and a current FIFO 83 simultaneously. A writing time as this moment is four cycles of 3 to 6 processor cycles. If the FIFO fails, writing is carried out for the current MM 84 and for the standby MM 84' simultaneously, and the writing is not carried out with respect to the FIFO 83 which has failed. For the connection delay time, a processor cycle 7 is allocated.

FIG. 15 is a time chart showing a data transfer timing from the FIFO 83 to the standby MM 84'. This timing is substantially the same as the timing explained with reference to FIG. 5, and thus an explanation thereof will be omitted. The operation of the system shown in FIGS. 12 and 13 is the same as that of the system shown in FIGS. 10 and 11, except for the operation at the time of failure of the FIFO, and therefore, only the operation at the time of FIFO failure will be described.

For example, if the FIFO 83 causes a problem such as a parity error, a fault indication signal F will be 1. Accordingly, the 2 to 1 selector 121 to which the input and output of the FIFO 83 are connected selects B to bypass the FIFO 83. On the other hand, the fault indication signal F is also supplied to the gate 132 so that an output RQF of the D-type flip-flop cannot pass through the gate 132. Therefore, the standby MMCTL 45' is not activated, and the FIFO 83 does not autonomously transfer data to the standby MM 84', because the 2 to 1 selector 121 selects B in response to the fault indication signal F but does not select the output of the FIFO 83.

When the CPU 81 writes data into the active MM 84, the CPU 81 provides a write instruction signal WT to the FIFO 83. The signal WT is supplied as a write instruction control signal WTC through the 2 to 1 selector 130 and gate 131 to the MMCTL 45. Also, the signal WT becomes a signal WTC' through the 2 to 1 selector 130' and gate 131' of the standby system. At this time, the gates 131 and 131' are in an open state due to a signal G indicating the fault in the FIFO. When the signals WTC and WTC' enter the MMCTL 45 and MMCTL 45', the same data is written in the MM 84 and MM 84' with the timing shown in FIG. 14. If the FIFO fails, the MM access time increases due to the cross connection delay so that the processing capacity of the CPU decreases, but in this state, the contents of both MMs are compared with each other and, if there is a difference therebetween, data is transferred from the current system to the standby system to make them coincide with each other. As a result, the CPUs can be switched from one to another while the processing is continued. Namely, it is not necessary to stop the processing as in the embodiment shown in FIGS. 10 and 11.

If the FIFO 83 is full of data, queuing may be realized with the same circuit as that shown in FIG. 7.

As described above with reference to FIGS. 8 to 15, according to the write through mode of the other embodiment of the present invention, the provision of the FIFOs and the autonomous reading mechanisms thereof enable data to be written into the MM of the standby system at a speed at which the data is written into the MM of the current or active system. Namely, at the MM access speed at which the data is written into the active MM, the hot memory standby system is realized.

As is apparent from the above explanations, according to the present invention, in a hot standby memory copy system including main storage devices that are duplexed, FIFOs are provided to eliminate the need for consideration of the cross connection delay in writing data from a CPU into both the main storage devices to improve a processing speed. In addition, it is not necessary to consider the influence of the cross connection delay in cache memories, so that the high speed of the cache memories can be properly utilized.

We claim:

1. An information processing system, comprising:
   active and standby central processing units;
   active and standby main storage devices;
   active and standby cache memories connected respectively to the active and standby central processing units and to the active and standby main storage devices; and
   a hot standby memory copy system comprising:
   active and standby first-in first-out memories, corresponding to the active and standby central processing units and connected respectively to the central processing units;

means for writing data, when data is written from the active central processing units into the active cache memory, simultaneously into the active first-in first-out memory; and means for writing, independently of the operation of the active central processing unit, contents of the active first-in first-out memory into the standby main storage device.

2. A system as claimed in claim 1, wherein said active and standby cache memories and said active and standby first-in first-out memories are cross connected to said active and standby main storage devices for duplexing data storage with respect to the main storage devices respectively to perform a copy back mode operation.

3. A system as claimed in claim 2, wherein, when the active cache memory connected to the active central processing unit is accessed by the active main storage device, data writing is carried out by said active cache memory to both of the main storage devices, while data reading by said active cache memory is carried out from only the active one of the main storage devices.

4. A system as claimed in claim 2, further comprising means for putting the active central processing unit into a queue mode when writing data from the active central processing unit into the active cache and into said active first-in first-out memory, if said active first-in first-out memory is full at the time when the active central processing unit is starting to write the data into said active first-in first-out memory.

5. A system as claimed in claim 2, further comprising:
a bus connected to said first-in first-out memory and said main storage devices; and
means, connected to said bus, for periodically sending a request for securing the bus connected to the main storage devices and, after securing the bus, reading out the contents of said active first-in first-out memory and writing the read data into both of the main storage devices.

6. A system as claimed in claim 2, said system further comprising means for referring to an empty indication of said active first-in first-out memory connected to the active one of the central processing units and, when the central processing units are switched from the active to the standby, the standby central processing unit is started as a new active central processing unit after confirming that the empty indication exists.

7. A system as claimed in claim 1, wherein, when data is written from the active central processing unit into the active cache memory, the same data is simultaneously written into the active main storage device to perform a write through mode operation.

8. A system as claimed in claim 7, further comprising means for putting the active central processing unit in a queue mode when writing data from the active central processing unit into the active cache memory and into said active first-in first-out memory, if said the active central processing unit is starting to write the data into said active first-in first-out memory.

9. A system as claimed in claim 7, said system further comprising means for notifying the standby central processing unit when there is no data to be transferred in one of said first-in first-out memories as a result of a transfer of the contents of said active first-in first-out memory to the standby duplexed main storage device.

10. A system as claimed in claim 7, further comprising means for detecting and indicating that a fault exists in said active first-in first-out memory, means for transferring data from the active central processing unit directly to the standby main storage device by bypassing the failed active first-in first-out memory, means for extending a memory access cycle with respect to the main storage devices and means for stopping an autonomous transferring operation of said active first-in first-out memory.

11. An apparatus, comprising:
an active central processing unit producing data;
an active cache memory connected to said active central processing unit, and receiving and storing the data;
an active main memory connected to said active cache memory;
an active first-in first-out memory connected to said active central processing unit, receiving, storing and outputting the data, and said active cache memory and said active first-in first-out memory simultaneously receiving and storing the data;
a standby central processing unit;
a standby cache memory connected to said standby central processing unit;
a standby main memory connected to said standby cache memory and said active first-in first-out memory and receiving and storing the data; and
a standby first-in first-out memory connected to said standby central processing unit.

12. An apparatus, comprising:
an active central processing unit producing data;
an active cache memory connected to said active central processing unit, receiving and storing the data;
an active main memory connected to said active cache memory;
an active first-in first-out memory connected to said active central processing unit, receiving, storing and outputting the data;
a standby central processing unit;
a standby cache memory connected to said standby central processing unit;
a standby main memory connected to said standby cache memory and said active first-in first-out memory and receiving and storing the data;
a standby first-in first-out memory connected to said standby central processing unit;
an active selector connected to said active first-in first-out memory, said active cache memory, said active main memory and said standby main memory, and selectively connecting the active first-in first-out memory to both said active and standby main memories when a cache hit occurs during writing by said active central processing unit; and
a standby selector connected to said standby first-in first-out memory, said standby cache memory, said standby main memory and said active main memory, and selectively connecting the standby first-in first-out memory to both said active and standby main memories when a cache hit occurs during writing by said standby central processing unit and when said standby central processing unit is activated.

13. An apparatus, comprising:
an active central processing unit producing data;
an active cache memory connected to said active central processing unit and receiving and storing the data;
an active main memory connected to said active cache memory;

an active first-in first-out memory connected to said active cache memory and receiving, storing and outputting the data, and said active cache memory and said active first-in first-out memory simultaneously receiving and storing the data;

a standby central processing unit;

a standby cache memory connected to said standby central processing unit;

a standby main memory connected to said standby cache memory and said active first-in first-out memory, receiving and storing the data; and a standby first-in first-out memory connected to said standby cache memory and said active main memory.

* * * * *

UNITED STATES PATENT AND TRADEMARK OFFICE
CERTIFICATE OF CORRECTION

PATENT NO. : 5,123,099

DATED : June 16, 1992

INVENTOR(S) : Shibata et al.

It is certified that error appears in the above-identified patent and that said Letters Patent is hereby corrected as shown below:

Col. 1, line 15, after "with" insert --only--.

Col. 2, line 47, after "ns" insert --exists for--.

Col. 6, line 68, "RAS)" should be --(RAS)--.

Col. 7, line 5, delete "2 to 1";
line 6, "set" should be --loaded--;
line 7, delete "2 to 1";
line 41, "to" should be --is--;
line 46, delete "be";
line 47, delete "receiving".

Col. 8, line 50, "provided" should be --produced--.

UNITED STATES PATENT AND TRADEMARK OFFICE
CERTIFICATE OF CORRECTION

PATENT NO. : 5,123,099

DATED : June 16, 1992

INVENTOR(S) : Shibata et al.

It is certified that error appears in the above-identified patent and that said Letters Patent is hereby corrected as shown below:

Col. 9, line 27, after "the" (second occurrence) insert --cross connection delay problem as described with reference to--.

Col. 10, line 24, delete "2 to 1".

Col. 11, line 49, "MM-CTL" should be --MMCTL--.

Col. 12, lines 8 and 16, delete "2 to 1".

Signed and Sealed this

Fifth Day of October, 1993

Attest:

BRUCE LEHMAN

Attesting Officer

Commissioner of Patents and Trademarks